April 21, 1959 — A. M. WRIGHT — 2,882,918
LIQUID FLOW REGULATING SYSTEM
Filed Nov. 14, 1955 — 3 Sheets-Sheet 1

INVENTOR
ALEXANDER M. WRIGHT
BY *Alec Prenter*
ATTORNEY

INVENTOR
ALEXANDER M. WRIGHT
BY *Alec Prentiss*
ATTORNEY

United States Patent Office 2,882,918
Patented Apr. 21, 1959

2,882,918

LIQUID FLOW REGULATING SYSTEM

Alexander M. Wright, West Hartford, Conn., assignor, by mesne assignments, to Chandler-Evans Corporation, West Hartford, Conn., a corporation of Delaware Application November 14, 1955, Serial No. 546,464

12 Claims. (Cl. 137—108)

This invention pertains to ways and means for regulating the pressure drop across a metering valve in the discharge conduit of a liquid pump, and more particularly has reference to means whereby a by-pass valve, in a shunt passage, connecting the discharge and inlet conduits of a constant displacement pump, can maintain a constant metering head (i.e., pressure drop) across the metering valve, regardless of variations in pressure levels and metered flow rates.

In the conventional arrangement for maintaining the discharge pressure and flow rate of a constant displacement, liquid pump at selected constant values, by means of a spring-biased, by-pass valve, in a shunt passage connecting the discharge and inlet conduits of the pump, the pump discharge pressure acts on the by-pass valve in an opening direction, and is opposed by the force of a spring biasing the valve in a closing direction. In such an arrangement, the pump discharge pressure is determined by the rate of the spring, in relation to the flow area through the valve; and where the cross-sectional area of the discharge conduit is fixed (i.e., constant), the flow rate therethrough is determined by the regulated pump discharge pressure.

In many applications of the foregoing means for regulating the pump discharge pressure, such as fuel control systems for internal combustion engines, the fuel flow from the pump to the engine is regulated by a metering valve, in the pump discharge conduit downstream from the by-pass passage around the pump, which valve varies the flow area therethrough in accordance with its position (i.e., degree of opening). In such applications, it is essential that the metering head (i.e., pressure drop) across the metering valve be maintained as nearly as possible at a constant value, regardless of variations in pressure levels and flow rates of the liquid flowing from the pump to the engine. Heretofore, great difficulty has been experienced in attaining this objective, owing to unavoidable variations of said metering head, with variations in said pressure levels and flow rates, particularly where close regulation of the metering head to a constant value is required.

The said variation of metering head across the metering valve is caused by the nature of the action of the hydraulic and spring forces acting on the by-pass valve. The said hydraulic force has three principal components: namely, (1) inertial force, which is easily determinable; (2) friction, which can also be closely calculated; and (3) a force produced by the momentum of the flow of the liquid through the flow area of the by-pass valve, which is usually far larger than the two other forces. Heretofore, there has been practically no information available as to the origin of this last force, or on methods for its reduction. Hence, by-pass valves heretofore in use, have not had embodied any means for dealing with said force, and therefore have been inherently incapable of eliminating, or even substantially reducing, the variations in metering head caused thereby.

One of the principal objects of my invention is to provide a novel type of by-pass valve, having incorporated therein means for substantially eliminating variations in metering head (across its associated metering valve), with variations in pressure levels and flow rates therethrough, by automatically creating an hydraulic force which (acting on said by-pass valve), opposes and balances the hydraulic momentum force produced by the flow of liquid through said valve, and thereby substantially eliminates said variations of said metering head.

Another object of my invention is to provide a novel form of by-pass valve, wherein the means mentioned in the preceding paragraph comprises a specially contoured, semi-annular flange which extends outwardly from the cylindrical body of the by-pass valve and into the outlet ports whose flow area is controlled by said valve.

With these and other objects in view which may be incident to my improvements, my invention consists of the combination and arrangement of elements hereinafter described and illustrated in the accompanying drawings, in which.

Figure 1:
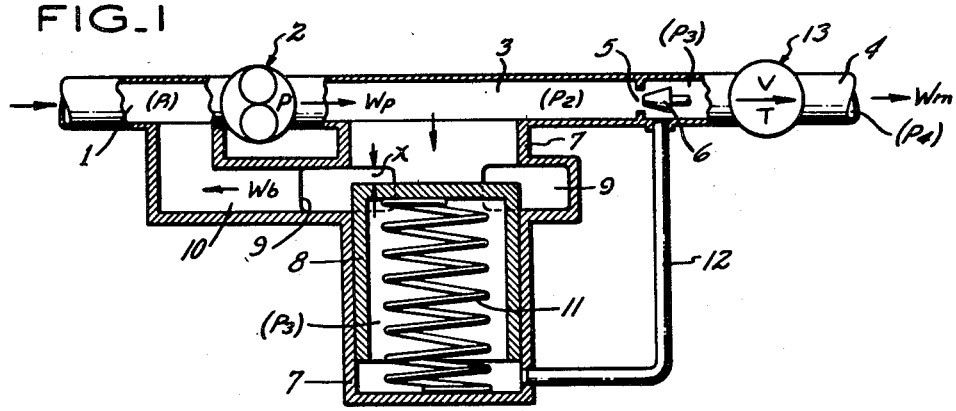
Figure 1 is a sectional, schematic view of a conventional liquid fuel system for an internal combustion engine, wherein the metering head (pressure drop) across a variable-area metering valve is regulated by a spring-biased, by-pass valve in the conventional manner, typical of the prior art.

Referring to Figure 1, the reference numeral 1 denotes an inlet conduit leading from a fuel supply tank (not shown) to a constant displacement fuel pump 2 which supplies fuel through connecting conduits 3 and 4 to an internal combustion engine (not shown). In the connection between conduits 3 and 4 is a metering orifice 5 whose flow area is varied by the position of a metering valve 6, whereby the fuel flow to the engine is regulated as required for the desired operation of the engine. Between pump 2 and orifice 5, conduit 3 communicates with a cylinder 7, in which is slidably mounted a piston by-pass valve 8, which varies the flow area through a plurality of outlet ports 9, that are connected by a passage 10 with inlet conduit 1. By-pass valve 8 is biased upwardly toward closed position by a spring 11 and the fuel pressure ($P_3$) communicated, through a conduit 12, from conduit 4 to cylinder 7 below piston 8, in opposition to the fuel pressure ($P_2$) in conduit 3 which acts downwardly on valve 8. A manually operated throttle (cut-off) valve 13 controls the flow of fuel to engine through conduit 4, except when said valve is in normal full-open position, whereupon the fuel flow in conduit 4 is regulated by valve 6.

With the foregoing arrangement, it is apparent that as the pressure ($P_2$) in conduit 3 increases (as with increase in speed of pump 2), the pressure drop ($P_2-P_3$) across orifice 5 and valve 6 correspondingly increases, whereby by-pass valve 8 is moved downwardly and the flow area through outlet ports 9 is increased, until the increased flow of fuel through conduit 10 causes the pressure ($P_2$) in conduit 3 to return to its original value, as determined by the force and rate of spring 11. In this manner, the pressure ($P_2$) in conduit 3 is maintained at an approximately constant value. Since ($P_2$) has an approximately constant value, the value of the pressure ($P_3$) in conduit 4, and the pressure differential ($P_2-P_3$), are determined by the degree of opening of metering valve 6. But since the pressure differential ($P_2-P_3$) also determines the position of by-pass valve 8, it follows that the pressure differential ($P_2-P_3$) will also be maintained at an approximately constant value by said by-pass valve.

However, since by-pass valve 8 is also acted upon (in a closing direction) by the momentum flow of fuel flow through ports 9, variations in said flow produce movements of said valve which in turn cause variations in the pressure differential ($P_2-P_3$) across the metering valve 6, even when said metering valve is in a fixed position. Hence, variations in pressure levels $P_2$ and $P_3$, and consequent variations in flow rates through valve 6, cause undesirable variations in the pressure differential ($P_2-P_3$), so that the fuel flow through conduit 4 to the engine is not accurately determined solely by the position of metering valve 6, as it should be for the proper control of the engine by metering valve 6.

This difficulty is inherent in the operation of the conventional by-pass valves heretofore employed in fuel supply systems of internal combustion engines, and it cannot be avoided unless means are provided to automatically generate an hydraulic force that will act on the by-pass valve (8) in an opposing direction, and balance the momentum force of the liquid efflux which tends to close the by-pass valve.

Figure 2:
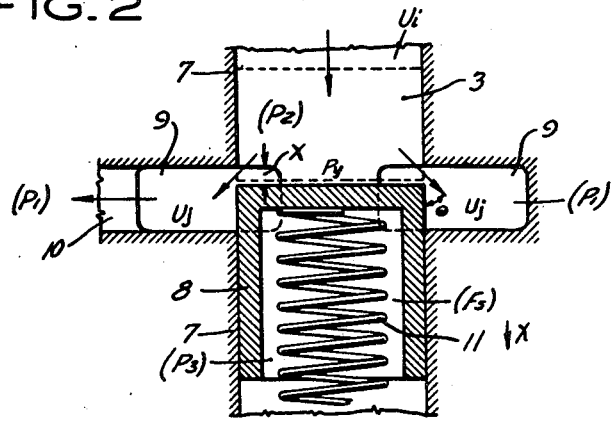
Figure 2 is a sectional view, on a slightly enlarged scale, of the by-pass valve, and associated outlet ports, shown in Figure 1.
Figure 3:
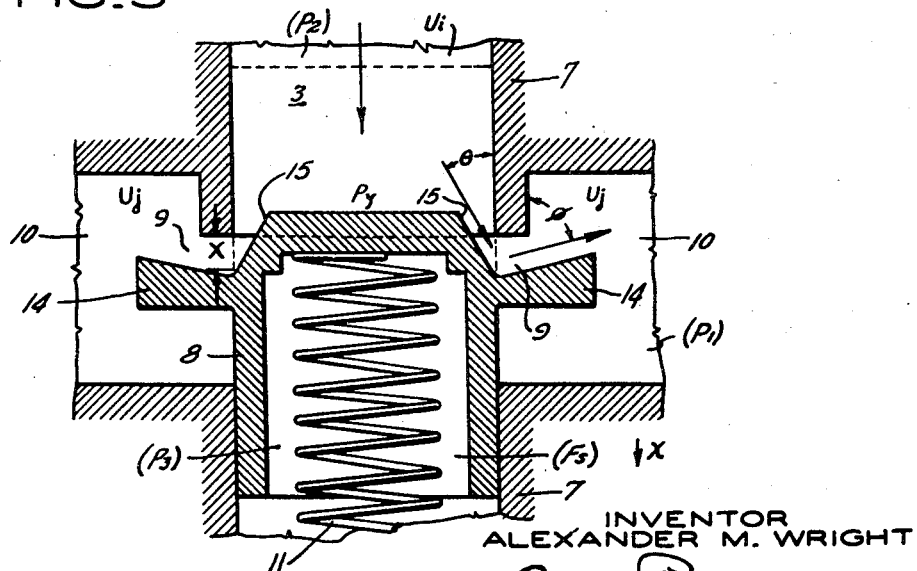
Figure 3 is a sectional view, similar to Figure 2 but on a still greater enlarged scale, showing a by-pass valve constructed and arranged according to my invention.

I have found that such a balancing force can be automatically generated by a specially contoured semi-annular flange 14 (see Fig. 3), which extends laterally outward from the cylindrical wall of by-pass valve 8 through the outlet ports 9, whereby the liquid passing through said ports is deflected, in an upwardly sloping direction, so that the axis of the issuing liquid stream makes a selected angle, $\phi$, with the vertical outer face of the port wall, as shown in Figure 3. At the same time, the outer edge of the top face of valve 8 is also bevelled at a selected angle, so that the axis of the liquid stream entering the ports 9 makes a selected angle $\theta$ with the vertical inner face of the port wall. By thus deflecting the liquid streams passing through ports 9, from an entering angle of $\theta$ to an exiting angle, $\phi$, there is automatically generated an axial force which acts on valve 8, in a downward (opening) direction to oppose the axial upwardly acting force which tends to close valve 8, when it has the conventional form shown in Figures 1 and 2. As shown on column 6, lines 60–66 below, when the angles $\theta$ and $\phi$ are given proper selected values, the efflux forces, of the liquid passing through ports 9 and acting on valve 8, can be made equal and opposite, so that they balance each other, whereby the undesirable variation on the metering head ($P_2-P_3$), with variations in pressure levels, $P_2$ and $P_3$, and rates, $w$, of fuel flow to the engine, can be substantially eliminated. This elimination of variations in the metering head ($P_2-P_3$), causes the rate of metered fuel flow, $W_m$, to be solely and accurately determined by the position of the metering valve 6, regardless of variations in pressure levels $P_2$ and $P_3$, and rates of fuel flow, $w_p$, in the fuel supply system.

The manner in which the flange 14, and the bevelled portion of by-pass valve 8, accomplish the above-mentioned results can best be described in terms of the following mathematical analysis of the operation of my invention, wherein the symbols employed are defined as follows:

$A_1$ = area of fluid jet entering by-pass valve _____ in.²
$A_b$ = cross-sectional area of by-pass valve _ in.²
$A_j$ = area of fluid jet leaving by-pass valve _____ in.²
$A_V$ = K x by-pass valve open area _____ in.²
$C_d$ = valve coefficient _____ lb.¹/²/in. sec.
$F_{ob}$ = spring preload _____ lbs.
$F_s = F_{ob} + K_b$ x by-pass valve spring force __ lbs.
$K_b$ = by-pass valve spring rate _____ lb./in.
$K_u$ = by-pass valve area vs. stroke constant _____ in.²/in.
$g$ = gravity constant _____ in./sec.²
$P_1$ = boost pressure _____ lb./in.²
$P_2$ = pressure upstream of metering valve _ lb./in.²
$P_3$ = pressure downstream of metering valve _____ lb./in.²
$P_4$ = nozzle pressure _____ lb./in.²
$P_y$ = pressure at face of by-pass valve ____ lb./in.²
$\gamma$ = density of metered fluid _____ lb./in.³
$w_b$ = by-pass flow _____ lb./sec.
$\theta$ = angle of undeflected fluid jet
$\phi$ = angle of deflected jet
$x$ = by-pass valve displacement _____ in.
$W_p = W_m + W_b$ = total flow from pump ___ lb./hr.
$W_m$ = metered flow _____ lb./hr.
$W_b$ = by-pass flow _____ lb./hr.
$U_j$ = velocity of jet of efflux _____ in./sec.
$U_i$ = velocity of jet of influx _____ in./sec.

In the typical by-pass valve application shown in Figure 1, the purpose of the by-pass valve is to maintain a constant metering head across the metering valve regardless of pressure levels and meter flow rate. Ideally, with no hydraulic forces acting upon the by-pass valve, and with a by-pass valve spring of zero rate, the pressure drop, $P_2-P_3$, across the metering valve is determined by the forces acting upon the by-pass valve, i.e., $$P_2 - P_3 = \frac{F_{ob}}{A_b} = a \text{ constant}$$

However, as fluid passes through the valve it exerts momentum forces upon the valve. These momentum forces in conjunction with forces due to changes in valve spring displacement result in a change in the pressure drop, $P_2-P_3$. The magnitude of these forces is dependent upon both the by-pass flow rate and the pressure drop, $P_2-P_1$.

Figure 2 is a schematic of the by-pass valve and shows the forces acting upon it. The dotted volume represents the fluid directly above the face of the by-pass valve. The equations describing the forces acting on the by-pass valve are as follows.

The downward forces acting on the dotted volume are:

$$(P_2 \cdot A_b) + \frac{w}{g} u_i \qquad (1)$$

The upward forces acting on the dotted volume are:

$$(P_y \cdot A_b) + \frac{w}{g} u_j \cos \theta \qquad (2)$$

Equating Equations 1 and 2 and rearranging:

$$P_y = P_2 + \frac{w}{gA_b}[u_i - u_j \cos \theta] \qquad (3)$$

The downward force acting on the valve is:

$$P_y \cdot A_b$$

The upward forces acting on the valve are:

$$(P_3 \cdot A_b) + F_{ob} + K_b \cdot x \qquad (5)$$

Equating Equations 4 and 5 and rearranging:

$$P_y = P_3 + \frac{1}{A_b}[F_{ob} + K_b x] \qquad (6)$$

Equating Equations 3 and 6 and rearranging:

$$P_2-P_3=\frac{1}{A_b}\left[F_{ob}+K_b\cdot x+\frac{w}{g}u_j\cos\theta-\frac{w}{g}u_i\right] \quad (7)$$

but $$u_j=\sqrt{\frac{2g}{\gamma}(P_2-P_1)} \text{ and } u_i=\frac{1}{A_1}\cdot\frac{w}{\gamma}$$

Substituting these in Equation 7:

$$P_2-P_3=\frac{1}{A_b}\left[F_{ob}+K_b\cdot x+w\sqrt{\frac{2}{\gamma g}(P_2-P_1)}\cdot\cos\theta-\frac{w^2}{\gamma g A_1}\right] \quad (8)$$

in addition $$W=C_dA_v\sqrt{P_2-P_1}=2.78A_v\sqrt{P_2-P_1}$$

and $$A_v=K_vx$$
$$\therefore w=2.78\,K_v x\sqrt{P_2-P_1};$$

hence $$x=\frac{w}{2.78\,K_v\sqrt{P_2-P_1}} \quad (9)$$

and substituting Equation 9 in Equation 8

$$P_2-P_3=\frac{1}{A_b}\left[F_{ob}+\frac{wK_b}{2.78\,K_v\sqrt{P_2-P_1}}\right.$$
$$\left.+w\sqrt{\frac{2}{\gamma g}(P_2-P_1)}\cdot\cos\theta-\frac{w^2}{\gamma g A_1}\right] \quad (10)$$

From Equation 10, it can be seen that metering head, $P_2-P_3$ is a function of both by-pass flow, $w$, and the pressure drop, $P_2-P_1$.

Figure 4:
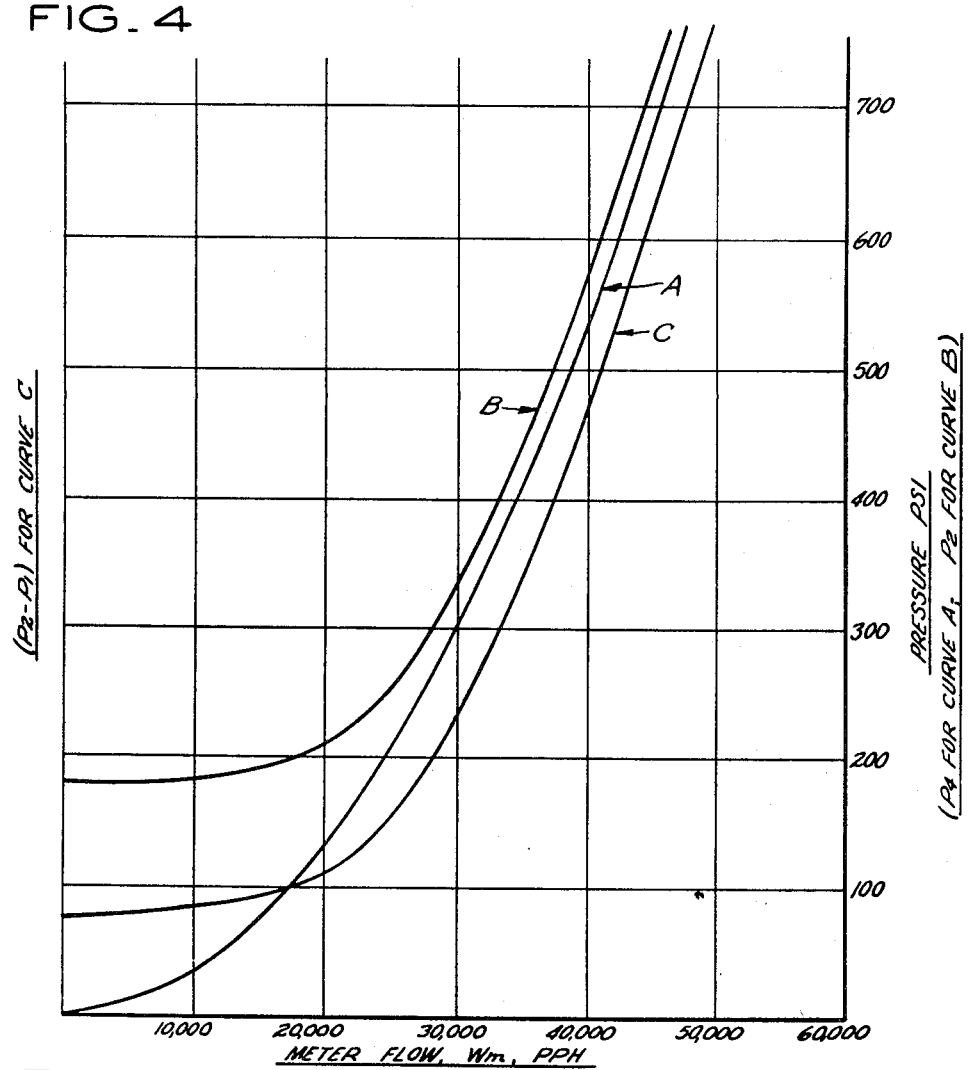
Figure 4 is a graph showing the relation of the metered fuel to certain pressures and pressure differentials in an afterburner fuel supply system for jet engines, arranged as shown in Figure 1.

From Equation 10, it can be seen that the metering head, $P_2-P_3$, is dependent upon the spring bias, $$\frac{F_{ob}}{A_b}$$

the spring rate forces $$\frac{wK_b}{2.78\,K_v\sqrt{P_2-P_1}}$$

the hydraulic closing force $$w\sqrt{\frac{2}{\gamma g}(P_2-P_1)}\cdot\cos\theta$$

the hydraulic opening force $$\frac{w^2}{\gamma g A_1}$$

the available pressure drop, $P_2-P_1$, across the by-pass valve, and the by-pass flow rate, $w$. In the afterburner controls where a positive displacement pump is used, the total flow, $W_p$, is essentially a constant and equal to the sum of the metered flow, $W_m$, and by-pass flow, $W_b$. In Figure 4, curve A is a plot of the required metered flow versus the nozzle pressure, $P_4$, for the conventional arrangement shown in Figure 1. Until the shut-off valve is completely open, it regulates the pressure, $P_3$, at a nearly constant value above the control pressure, $P_{2m}$, behind the shut-off valve. With the shut-off valve completely open, however, the pressure, $P_3$, is equal to the nozzle pressure, $P_4$, plus the pressure drop due to the flow through the discharge passageway. Since the pressure, $P_2$, is maintained at a constant value above $P_3$, the relationship between metered flow, $W_m$ and $P_2$ can be calculated. In Figure 4, curve B is a plot of $P_2$ versus metered flow, $W_m$. Since the pressure, $P_1$, is maintained at a constant value, the available pressure drop across the by-pass valve $(P_2-P_1)$ versus metered flow $W_m$, can be calculated. The pressure drop, $P_2-P_1$, available across the by-pass valve versus metered flow is shown by curve C in Figure 4.

If the by-pass valve configuration shown in Figure 2 is replaced by the configuration shown in Figure 3, it is possible to substantially eliminate the variation in metering head, $P_2-P_3$. Essentially the latter configuration changes the direction of the efflux jet so that the hydraulic momentum forces acting upon the by-pass valve are balanced. The equations describing the forces acting on the by-pass valve are as follows.

The downward forces acting upon the by-pass valve are:

$$(P_v\cdot A_b)+\frac{w}{g}u_j\cos\theta+\frac{w}{g}u_j\cos\phi \quad (11)$$

The upward forces acting upon the by-pass valve are:

$$(P_3\cdot A_b)+F_{ob}+K_b\cdot x \quad (12)$$

Equating Equations 11 and 12 and rearranging:

$$P_v=P_3+\frac{1}{A_b}\left[F_{ob}+K_b\cdot x-\frac{w}{g}u_j\cos\theta-\frac{w}{g}u_j\cos\phi\right] \quad (13)$$

The downward forces acting upon the dotted volume of fluid are:

$$(P_2\cdot A_b)+\frac{w}{g}u_i \quad (14)$$

The upward forces on the dotted volume of fluid are:

$$(P_v\cdot A_b)+\frac{w}{g}u_j\cdot\cos\theta \quad (15)$$

Equating Equations 14 and 15 and rearranging:

$$P_v=P_2+\frac{1}{A_b}\left[\frac{w}{g}u_i-\frac{w}{g}u_j\cdot\cos\theta\right] \quad (16)$$

Equating Equations 13 and 16 and rearranging:

$$P_2-P_3=\frac{1}{A_b}\left[F_{ob}+K_bx-\frac{w}{g}u_j\cdot\cos\phi-\frac{w}{g}u_i\right] \quad (17)$$

but $$u_j=\sqrt{\frac{2g}{\gamma}(P_2-P_1)} \text{ and } u_i=\frac{1}{A_1}\frac{w}{\gamma}$$

and substituting these in Equation 17:

$$P_2-P_3=\frac{1}{A_b}\left[F_{ob}+K_b\cdot x-w\sqrt{\frac{2}{\gamma g}(P_2-P_1)}\cos\theta-\frac{w^2}{\gamma g A_1}\right] \quad (18)$$

in addition, $$-w=2.78A_v\sqrt{P_2-P_1} \text{ and } A_v=K_vx$$
$$\therefore w=2.78K_vx\sqrt{P_2-P_1}$$

Thus, $$x=\frac{w}{2.78K_v\sqrt{P_2-P_1}} \quad (19)$$

and substituting Equation 19 in 18

$$P_2-P_3=\frac{1}{A_b}\left[F_{ob}+\frac{wK_b}{2.78K_v\sqrt{P_2-P_1}}-\right.$$
$$\left.w\sqrt{\frac{2}{\gamma g}P_2-P_1}\cos\phi-\frac{w^2}{\gamma g A_1}\right] \quad (20)$$

Comparing Equations 20 and 10, it can be seen that the parameter, $\theta$, which is essentially a constant, 60°, has been canceled out by profiling the face of the by-pass valve. In its place we have the angle, $\phi$, which can be chosen so as to make the last three terms in Equation 20 as nearly constant as desired, thus substantially eliminating the variation in metering head, $P_2-P_3$.

By trial and error in test runs, it was found that the least variation in the last three terms in Equation 20 occurs when $\cos\phi=0$.

Figure 5:
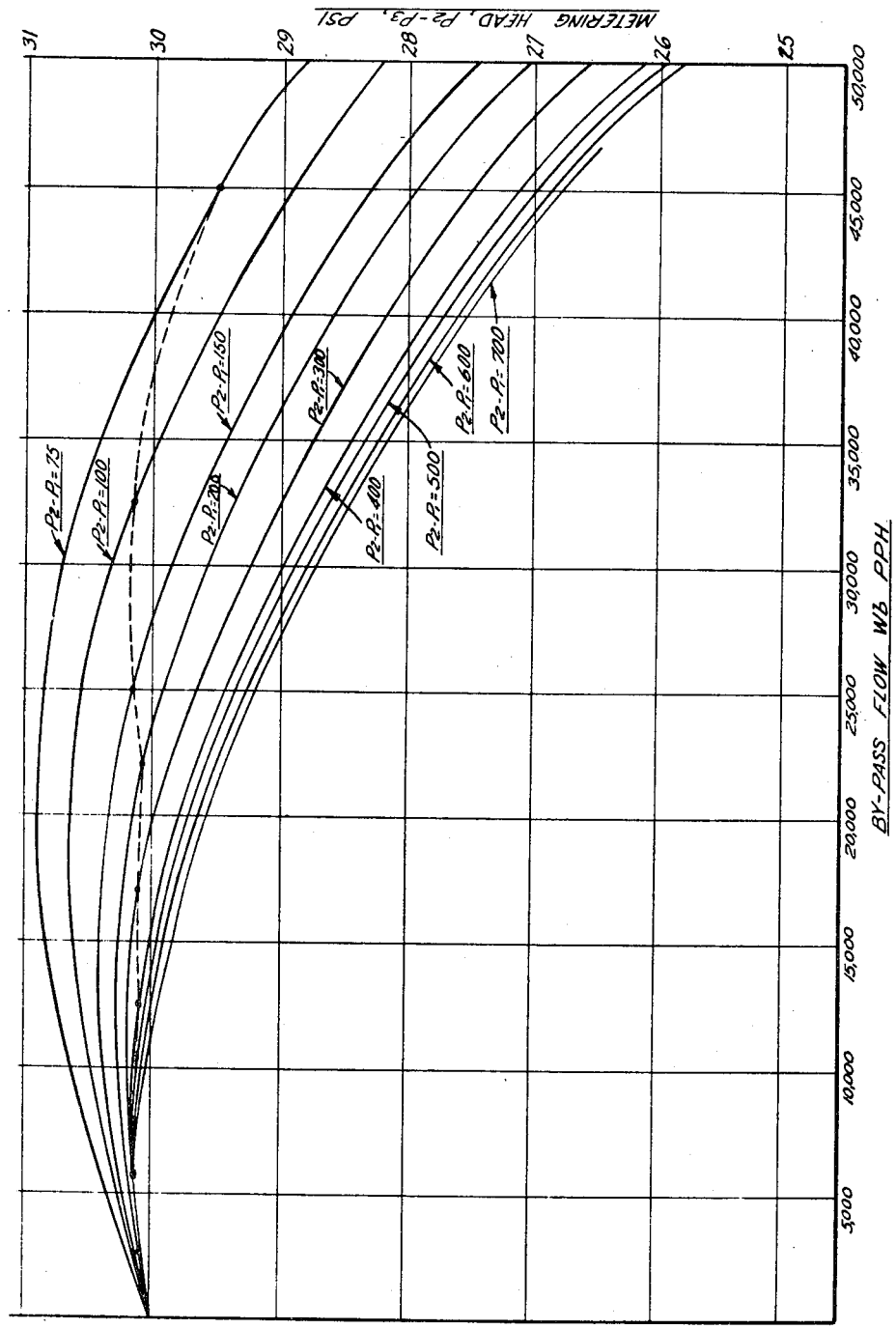
Figure 5 is a graph showing the variation in metering head in relation to by-pass fuel flow, with different values of pressure differential across the metering valve, in the fuel supply system arranged in Figure 4, but which embodies the novel type of by-pass valve shown in Figure 3.

The solid line curves in Figure 5 were plotted from Equation 20 for various pressure levels and by-pass flows in a typical application of my invention, and show the characteristics of the by-pass valve of my invention under actual operating conditions. These curves are cross plotted with curve C of Figure 4, to determine the metering head characteristics obtained with the novel by-pass valve of my invention. The resulting performance is shown as a dotted curve in Figure 5.

Figure 6:
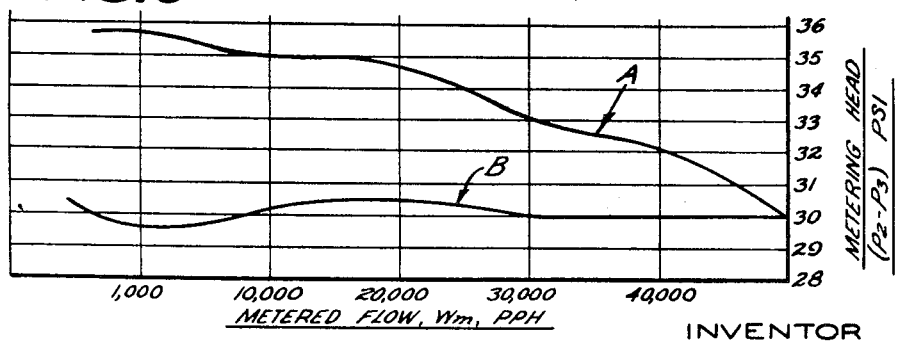
Figure 6 is a graph showing the variation in metering head with metered fuel flow, over the operating range of an afterburner fuel supply system, as shown in Figure 1, in comparison with the same data for the same system, but in which my novel form of by-pass valve (Figure 3) is substituted for the conventional by-pass valve shown in Figure 1.

In Figure 6 curves A and B are determined in the same manner as the dotted curve in Figure 5, and show the improved performance of the novel type by-pass valve of Figure 3, in comparison with the conventional by-pass valve of Figures 1 and 2. It will be noted from curve A, which indicates the performance of the conventional by-pass valve of Figures 1 and 2, that the metering head ($P_2-P_3$) varies from 36 to 30 p.s.i., with increasing metered fuel flow, $W_m$; whereas, curve B, which applies to the novel type of by-pass valve of Figure 3, shows that the metering head ($P_2-P_3$) is maintained at a substantially constant value of 30 p.s.i. In other words, while the metering head ($P_2-P_3$) varies from 30 to 36 p.s.i. (i.e., 20 percent), with increasing metered fuel flow, $W_m$, for the conventional by-pass valve, said variation is less than .50 p.s.i. from the desired value of 30 p.s.i., for the novel type by-pass valve shown in Figure 3.

While I have disclosed my invention as applied to an afterburner fuel system for jet engines, it is to be understood that it is not limited to such use, but is applicable to the regulation of liquid flow generally. I also desire it to be understood that I do not limit myself to the particular construction and arrangement of elements, herein described and shown in the drawings by way of illustration, since these may be changed and modified by those skilled in the art without departing from the spirit of my invention or exceeding the scope of the appended claims.

I claim:

1. A valve for controlling the pressure and flow of liquid in a conduit, said valve comprising: a reciprocable head coacting with a fixed seat, to vary the flow area therethrough; said head being so constructed and arranged as to be moved in an opening direction by a liquid differential pressure applied thereto; a spring biasing said head in a closing direction, in opposition to said pressure differential; said valve having operatively associated means, for automatically balancing the hydraulic momentum forces acting on said valve head, owing to the flow of liquid therethrough, with the force of said spring; whereby variations in said pressure differential with variations in pressure levels and flow rates through said conduit, are substantially eliminated, and said pressure differential is thus always maintained at a constant value, regardless of variations in said pressure levels and flow rates.

2. A valve as in claim 1, wherein said means includes means for automatically generating a force, derived from the efflux momentum of the liquid flowing through said valve, which force acts on said valve head in an opening direction, and tends to balance the force exerted on said valve head, in a closing direction, by the influx momentum of the liquid flowing therethrough.

3. A valve according to claim 2, wherein the included means recited in claim 2 comprises means for imparting to the liquid stream flowing from said valve an efflux angle, $\phi$, of such selected magnitude, relative to the magnitude of the influx angle, $\theta$, of the liquid stream entering said valve, as to balance the difference in momentum forces, exerted on said valve head by the influx and efflux of the liquid stream passing through said valve, with the force exerted by said spring on said valve head.

4. A valve as in claim 3, wherein the comprised means recited in claim 3 also includes an integral flange which extends radially outward from the body of said valve head beyond said valve seat, and has a contoured surface, so shaped and arranged as to impart to the liquid stream flowing from said valve a selected angle of efflux, $\phi$.

5. A valve according to claim 4, wherein the included means recited in claim 4 also comprises an annular bevelled portion on said valve head which merges with the contoured surface of said flange, and is so shaped and arranged as to impart to the liquid stream flowing from said valve a selected angle of influx, $\theta$.

6. A liquid flow regulating system, comprising a flow conduit having therein a variable-area restriction for regulating the rate of flow therethrough, and a spring-actuated valve for varying said area; means, operatively associated with said valve and restriction for automatically balancing the difference in momentum forces, exerted on said valve by the momentum of the liquid stream flowing therethrough, with the spring force acting on said valve, whereby said valve always remains in a constant, dynamically balanced position, regardless of pressure levels and flow rates of the liquid flowing therethrough.

7. A system as in claim 6, wherein said valve and operatively associated means includes means for automatically generating a force, derived from the efflux momentum of the liquid flowing through said valve, which force acts on said valve in an opening direction, and tends to balance the force exerted on said valve, in a closing direction, by the influx momentum of the liquid flowing therethrough.

8. A system as in claim 7, wherein the included means recited in claim 7 also includes means for imparting to the liquid stream flowing from said valve an efflux angle, $\phi$, of such selected magnitude, relative to the magnitude of the influx angle, $\theta$, of the liquid stream entering said valve, as to balance the difference in momentum forces, exerted on said valve by the influx and efflux of the liquid stream passing therethrough, with the force exerted by said spring on said valve.

9. A system as in claim 8, wherein the included means recited in claim 8 also includes an integral flange which extends radially outward from the body of said valve through said restriction, and has a contoured surface, so shaped and arranged as to impart to the liquid stream flowing from said restriction a selected angle of efflux, $\phi$.

10. A system as in claim 9, wherein the included means recited in claim 9 also comprises an annular bevelled portion of said valve which merges with the contoured surface of said flange, and is so shaped and arranged as to impart to the liquid stream flowing into said restriction a selected angle of influx, $\theta$.

11. Valve means for controlling fluid flow through an orifice, comprising a valve having a head, and a spring, acting directly on and coaxially with said head, for biasing said valve toward closed position; said valve head having means thereon which, coacting with said orifice, varies the volume and deflects the direction of the fluid stream flowing therethrough, in such manner as to balance the difference in the momentum forces acting on said valve head and caused by said fluid flow, with the force exerted by said spring on said valve.

12. Valve means as in claim 11, wherein the means on said valve head comprises a lateral flange, which extends outwardly beyond the area of said orifice and deflects said fluid stream through a preselected angle such as to cause said difference in said momentum forces to balance said spring force.

References Cited in the file of this patent

UNITED STATES PATENTS

| | | |
|---|---|---|
| 2,320,686 | Waserge | June 1, 1943 |
| 2,372,016 | Rockwell | Mar. 20, 1945 |
| 2,642,887 | Renick | June 23, 1953 |
| 2,665,704 | Kanuch | Jan. 12, 1954 |
| 2,715,416 | McKinley | Aug. 16, 1955 |
| 2,755,815 | Erle | July 24, 1956 |

FOREIGN PATENTS

| | | |
|---|---|---|
| 204,955 | Sweden | May 31, 1939 |